July 8, 1969  R. J. STEVENS  3,454,767
RADIANT ENERGY DETECTOR

Filed April 6, 1965

INVENTOR.
ROBERT J. STEVENS
BY
ATTORNEY

July 8, 1969  R. J. STEVENS  3,454,767
RADIANT ENERGY DETECTOR

Filed April 6, 1965  Sheet 2 of 3

INVENTOR.
ROBERT J. STEVENS
BY John F. Luhrs
ATTORNEY

United States Patent Office 3,454,767
Patented July 8, 1969

3,454,767
RADIANT ENERGY DETECTOR
Robert J. Stevens, Mentor, Ohio, assignor to Bailey
Meter Company, a corporation of Delaware
Filed Apr. 6, 1965, Ser. No. 445,949
Int. Cl. G01t *1/16;* H01j *5/16, 39/00*
U.S. Cl. 250—83.3                          9 Claims

ABSTRACT OF THE DISCLOSURE

A radiant energy detector having a cylindrical housing with a radiant energy sensor mounted in one end and a window mounted in the opposite end. Rotatable mirrors are mounted in the housing next to the window to direct radiant energy entering the window to a convex lens which concentrates the energy on the sensitive portion of the energy sensor. The cylindrical housing is positioned within a mounting tube such that an annular air space is defined through which purge air is directed against the window to prevent particle deposit on the window.

---

This invention relates to an energy guide. In particular this invention relates to an energy guide for transmitting ultraviolet energy from a source to a remotely mounted receiver.

In the past many different devices and theories have been exploited in attempts to accurately monitor the flame in a closed combustion chamber. Devices such as thermocouples or flame rods responsive to heat and conductivity of flames have been utilized. Light sensitive devices such as photo electric tubes have also been widely used. In partically all instances, however, these devices have been unreliable, forcing the operator to rely on crude devices, such as sighting tubes, to monitor the combustion flame. The thermocouple and flame rod devices deteriorate rapidly from erosion and corrosion and are only adaptable to specific types of burners. Photoelectric tubes have proven unreliable in that they respond to light from any source, not only light from the flame being monitored.

The most successful devices for monitoring a combustion flame are those which respond to invisible radiation, such as ultraviolet or infrared emitted by a flame. Infrared detectors are somewhat limited because they respond not only to the infrared emitted by the flame, but also that emitted by furnace brick work. The only acceptable flame monitors available today are those employing an ultraviolet sensitive tube and even here care must be used in mounting the detector unit.

Many flame monitoring applications present difficult if not impossible conditions for mounting an ultraviolet detector within close proximity of the flame. Two conditions that very often present problems are high temperatures in the vicinity of the flame and accessory equipment used in the burner construction. To successfully monitor the flame in these problem applications it is necessary to transmit the radiant energy from the flame to some remote location.

One method used, with some degree of success, is the sapphire rod approach. Unfortunately, sapphire rods are expensive and difficult to handle due to their fragile nature. Also the length of sapphire rods usually cannot exceed 18″ which is too short, since the distance in most applications will be nearly double that.

The problem of transmitting radiant energy from its source within a flame to a remotely mounted detector is not as simple as it may appear. As mentioned, temperatures in the vicinity of the flame are usually quite high and will adversely affect most materials that are useable in a transmission device. Corrosive gases and abrasive particles are also in abundance in the flame area and they tend to reduce the efficiency or destroy the effectivness of many transmitting schemes. When the energy being detected is ultraviolet in nature another difficulty arises, that is, the ultraviolet tends to concentrate in a small area which may move depending on the rate at which the burner is operating. Thus, for a radiation transmission guide to be acceptable it must be able to withstand fairly severe conditions.

Although it is difficult to realize, without a thorough knowledge of burner and furnace construction, it is sometimes necessary to mount a flame detector nearly parallel with, but offset from the energy source. It may also be necessary to mount the detector off to one side of the energy source making successful flame detection even more difficult. To detect a flame under all possible conditions a radiant energy transmission device must be versatile enough to be adaptable to many situations.

One of the objects of my invention is to provide a radiant energy guide that will transmit radiant energy from a source in a high temperature region to a remotely mounted detector.

To assure that my guide is not affected by the high flame temperatures I surround it with cooling air. By properly directing the air stream, critical surfaces of the guide are kept free from destructive corrosive gases and abrasive materials.

In addition to directing a stream of air around the guide, to protect it from high temperatures and destructive atmospheric conditions, I also seal the end of the guide with a quartz window. The air stream is also directed against this quartz window, thereby keeping it clear for maximum radiant energy transmission therethrough.

Another object of my invention is to provide a radiant energy guide that is capable of operating in and withstanding the corrosive and abrasive atmosphere surrounding the radiation source.

Still another object of my invention is to provide a radiant energy guide versatile enough to view a radiation source even with the detector mounted parallel to and at one side of the energy source.

Figure 1:
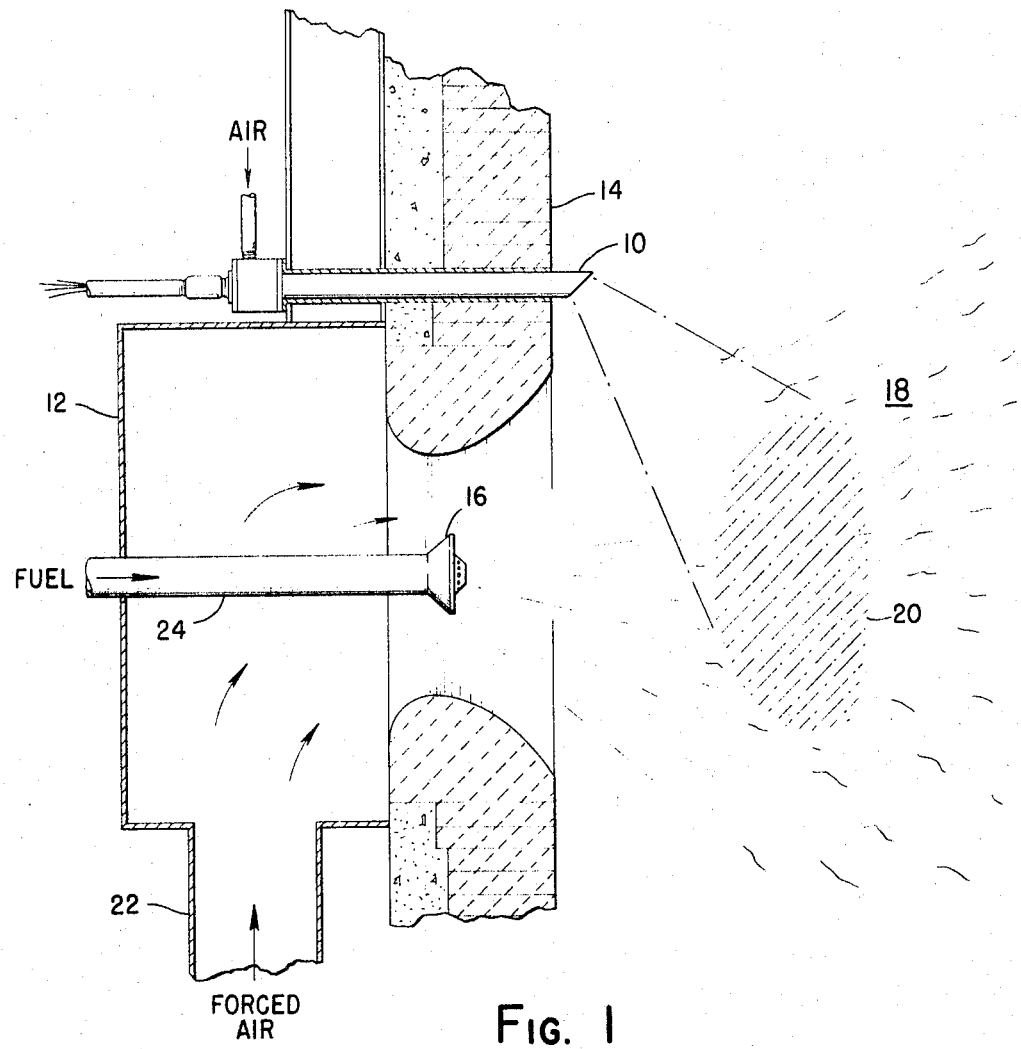
FIG. 1 is a schematic illustration of an energy guide for transmitting energy from a flame.

Referring now to FIG. 1, there is shown an extension tube 10 for a flame detector mounted above the windbox 12 of a furnace 14. Secondary air supplied through the windbox 12 from a duct 22, mixes with the fuel and primary air from a burner 16. The mixture is burning producing a flame 18 having an ultraviolet radiation field of presumed configuration such as generally indicated at 20. The furnace 14 is illustrated as a gas fired type having a pipe 24 for supplying fuel and primary air to the burner 16.

Radiant energy from the field 20 is transmitted through the extension tube 10 to an ultraviolet detector tube, not shown. Also not shown in FIG. 1 is the circuitry to which the detector tube would be connected. A complete description of a flame detector employing an ultraviolet sensitive tube is given in the U.S. application of Lyman F. Gilbert et al., Ser. No. 110,414, filed May 16, 1961, and assigned to the same assignee.

Figure 2:
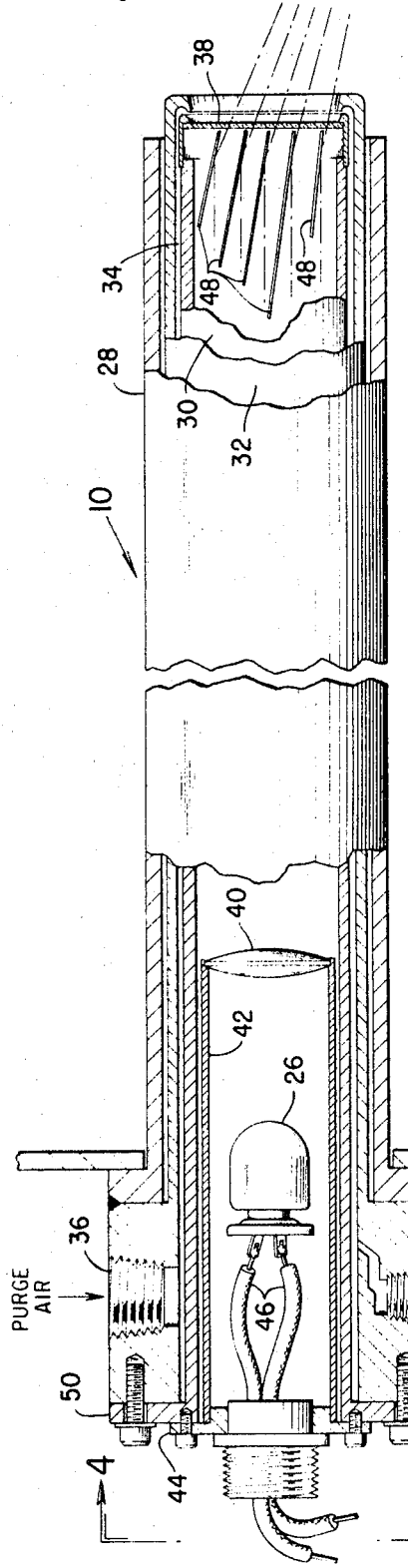
FIG. 2 is a schematic diagram of one variation of my enery guide.

Referring now to FIG. 2, I show in detail one form of extension tube 10 including an ultraviolet detector tube 26. The tube 10 consists of three concentrically mounted tubes, one merely being a mounting tube 28. The smaller tube of the three is the energy guide 30 for transmitting ultraviolet energy from the field 20 of FIG. 1 to the ultraviolet detector tube 26. Between the energy guide 30 and the mounting tube 28 is a purge tube 32 of length complemented to that of the energy guide 30 and in spaced relationship therewith to define an annular air space 34. To protect the inner surfaces of the energy guide 30 a quartz window 38 encloses that end of the guide adjacent to or within the furnace 14. Air, to prevent collection of ash and other products of combustion on the quartz window 38, is supplied the purge tube 32 at an opening 36. The energy guide 30 may be of desired length to accommodate different types of fuel and different flame conditions as will later be described.

Mounted within the energy guide 30 is a convex lens 40 for concentrating the ultraviolet energy transmitted from the field 20 on the active areas of the tube 26. The tube 26 comprises a gas filled glass envelope having a pair of shaped parallel electrodes therein and may take the form of the present commercially available ultraviolet detector tube manufactured by McGraw Edison Company. In operation of this tube, when a predetermined potential is applied to the electrodes, ionization of the filling gas will occur when ultraviolet radiation within a predetermined wave length band enters the tube. As a result the tube will conduct and a current will flow in an associated circuit.

The convex lens 40 and the detector tube 26 are a separate subassembly which includes a spacing tube 42 mounted to a connector flange 44 through which lead wires 46 are passed to connect the detector tube 26 to external circuitry. At the furnace end of the energy guide 30, protected by the quartz window 38, are a plurality of mirrors 48 each having a different angle with respect to the axial centerline of the extension tube assembly. By mounting each mirror at a different angle with respect to the centerline a field of view is created which can be made to include various selected areas of the flame 18, such as the ultraviolet field 20 of FIG. 1. Preferably the inner surface of the guide 30 is polished, coated or otherwise finished to provide a reflective surface so that radiation reflected from the mirrors 48 which is not parallel to the longitudinal axis of the guide 30 will be reflected down the guide to the detector tube 26.

Figure 3:
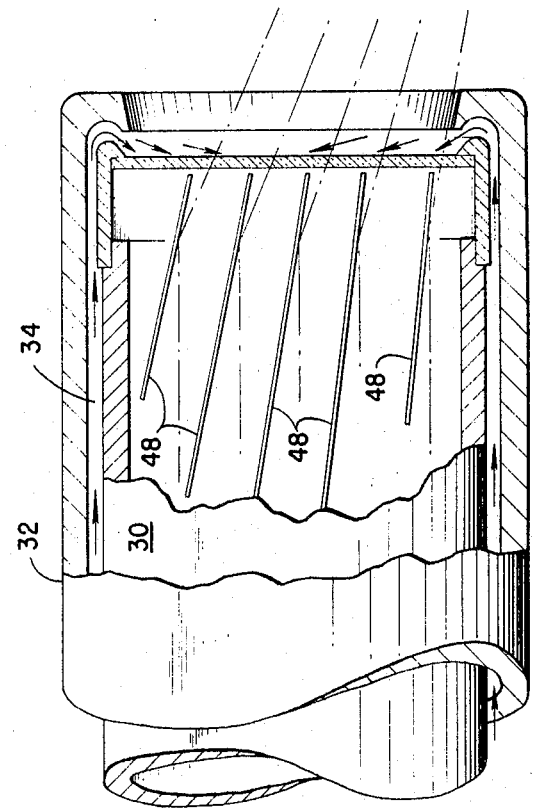
FIG. 3 is an enlarged view detailing the sighting end of the guide of FIG. 2.

Referring to FIG. 3 there is shown, in greater detail, the furnace end of the energy guide 30 and purge tube 32. Each mirror may be set at a different angle to transmit down the length of the energy guide 30, radiation from a particular part of a radiation field. The mirrors may also vary in length with the longer mirrors having smaller angles, with respect to the centerline of the energy guide 30. Further by the use of the mirror arrangement shown in FIG. 3 the reflected radiation which is not transmitted parallel to the axis of guide 30 has only a small angle and can be successfully reflected off its inner surface to the detector tube 26.

As mentioned previously, a quartz window 38 encloses the end of the energy guide 30 thereby protecting the mirror surfaces from the products of combustion which usually include corrosive gases and abrasive materials.

The ends of the energy guide 30 and the purge tube 32 provide an annular passageway whereby a stream of air is directed against the surface of the quartz window 38 to produce a unique cleaning and purging action as shown by the arrows in FIG. 3. This air purge substantially eliminates the collection of ash and other products of combustion from coating the window 38.

Figure 4:
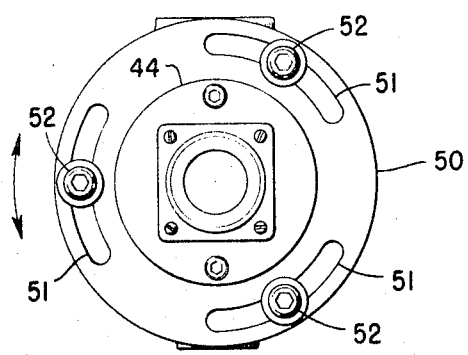
FIG. 4 is a view of the energy guide of FIG. 2 along the lines 4—4 in the direction of the arrows showing the rotating adjustment.

Referring to FIG. 4, I illustrate a device for rotatably mounting the energy guide 30 within the purge tube 32. FIG. 1 may be somewhat deceptive in that it does not show all the necessary piping and accessories associated with the burner 16. Often it is physically impossible to mount the extension tube assembly directly over the flame and it becomes necessary to rotate the energy guide to adequately view the field of radiation.

FIG. 4 is a rear view of the energy guide 30 along the line 4—4 of FIG. 2 in the direction of the arrows. A mounting ring 50 having 3 elongated slots 51 forms a flange for mounting the energy guide 30 in the purge tube 32. Located in the center of the mounting ring 50 is the connector flange 44 of the detector tube 26, spacing tube 42 and convex lens subassembly. Three mounting bolts 52 inserted through the elongated slots 51 are threaded into the rear collar of the purge tube 32. The mounting bolts 52, when tightened, hold the energy guide 30 in any desired position. To rotate the entire energy guide 30 including the lens subassembly and the mirrors 48, to give maximum viewing of the radiation field, it is only necessary to rotate the mounting ring 50.

The adjustable mounting feature shown in FIG. 4 and/or the use of different length energy guide assemblies provides a means of calibrating the output or sensitivity of a detector for the particular flame being monitored. The size of the radiation field of the flame 18 and the intensity of the ultraviolet radiation varies with different fuels and is related to the hydrogen-carbon ratio of the fuel. With a gas fired burner it has been found that a relatively small field immediately in front of the burner will produce the same amount of ultraviolet radiation as a much larger field in the case of a coal or oil flame. Due to the concentration of ultraviolet radiation in the range of 2,000–2,800 angstroms in a small field in the case of a gas burner, the energy guide 30 is adjusted to view a relatively small section of the overall flame. In the case of oil or coal fired furnaces the ultraviolet radiation is less concentrated and the guide must be adjusted to view a larger field.

Figure 5:
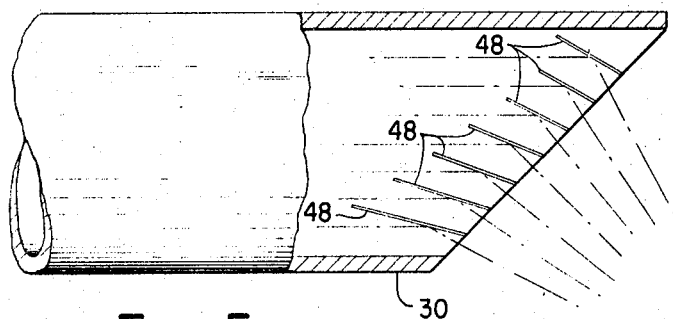
FIG. 5 is a schematic diagram of the sighting end of an energy guide for viewing a radiation source up to 90° from its axis.

It may be necessary, as shown in FIG. 1, due to particular mounting conditions, to mount the energy guide at some out of the way location. To properly monitor a flame in these difficult situations I schematically show in FIG. 5 the sighting end of an energy guide for viewing a radiation field which is offset from the extension tube's longitudinal centerline an amount which renders the use of a tube such as shown in FIGS. 2 and 3 difficult if not impossible. Referring to FIG. 5, the end of the energy guide 30 is sliced at an angle, such as 45°. Not shown in FIG. 5 is the quartz window and purge tube described with reference to FIGS. 2 and 3. These may be adapted, as will be evident to those skilled in the art, to all variations of the energy guide, their function and operation would be the same and will not be described again. As in the previous embodiments, each mirror 48 is set at a different angle with respect to the centerline of the extension tube 10.

The angle at which each mirror is preferably set is determined by the size and location of the radiation field with respect to the energy guide and the number of mirrors. With the mirrors properly set, radiation from the field will be collimated through the energy guide 30 to the convex lens 40. The collimated rays will then be focused on the active area of the detector tube 26 as explained previously which may therefore be mounted well away from the corrosive and abrasive atmosphere surrounding the flame. It is also protected from high flame temperatures.

Some rays which are incident to the mirror surfaces will not be reflected parallel to the guide axis but will be reflected to the inner surfaces of the guide 30. To facilitate transmission of the secondary rays to the convex lens 40 the guide inner surface is polished and reflective. From a standpoint of ultraviolet reflectivity and heat resistance, I have found a pure grade of aluminum or certain of its alloys to perform exceedingly well under high temperature conditions. The amount of radiation that finally enters the detector tube envelope is a combination of the collimaed rays and the reflected rays.

Figure 6:
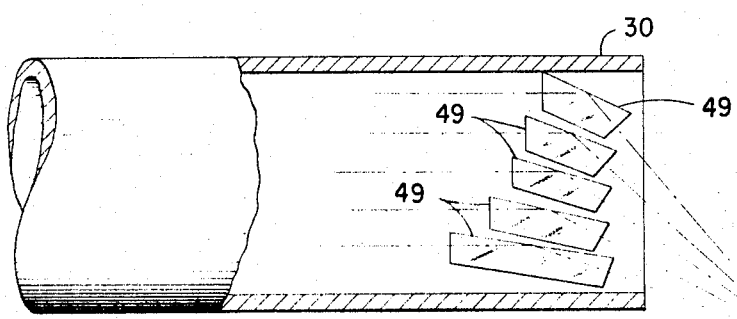
FIG. 6 shows a modified form of sighting end employing totally reflecting prisms.

As illustrated in FIG. 6, I may employ totally reflecting prisms, such as shown at 49, to direct the energy rays parallel to the axis of the guide 30. The prisms 49 may be made of quartz having the property of reflecting ultraviolet radiation and capable of withstanding high temperatures without deteriorating.

Figure 7:
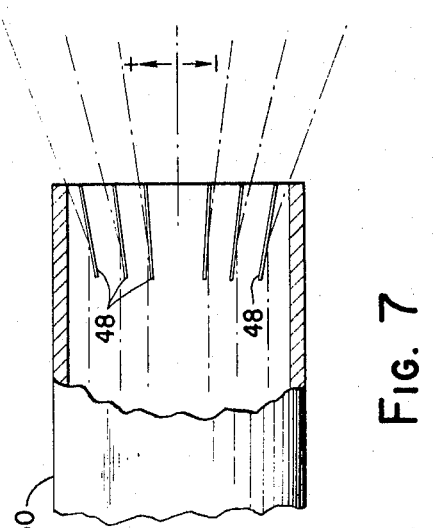
FIGS. 7 and 8 illustrate typical arrangements of the reflecting surfaces in the sighting end of the energy guide.

In some installations the extension tube is preferably mounted in the windbox 12 almost in line with the burner 16. In applications such as this, the energy guide 30 must have a viewing field directly in line with its center axis. Referring to FIG. 7, I show a mirror arrangement for materially increasing the size of the field viewed under such conditions. In the designs previously discussed the mirrors 48 were all set at angles to view radiation from the same general direction whereas in FIG. 7 the mirrors are so set that the viewing area of a radiation field is increased about equally in both directions from the tube centerline. The viewing field can be made larger or smaller as desired merely by adjusting the angle at which each mirror is set.

Figure 8:
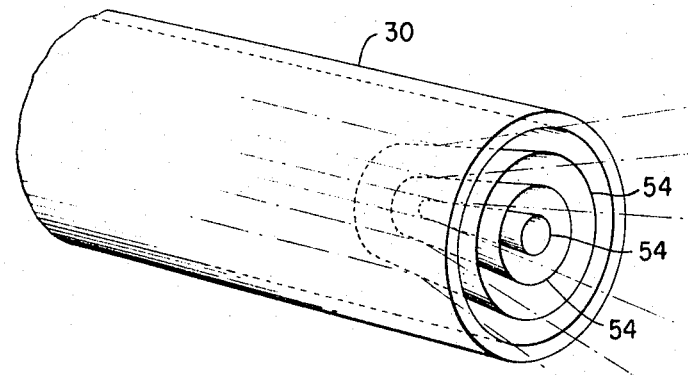

When using flat mirrors, such as shown in FIG. 7, the viewing field is basically an ellipse. The width of the field is approximately the width of the energy guide 30. A circular viewing field can be obtained by changing the mirror design from flat to cone shaped. Referring to FIG. 8, I show an embodiment of my invention using a plurality of concentrically mounted cone shaped mirrors 54. The same criteria apply in determining the shape of a cone shaped reflector as used in determining the angle of the flat mirrors. With the cone shaped reflectors, the centerline of the viewing field will be conincident with the centerline of the extension tube.

Figure 9:
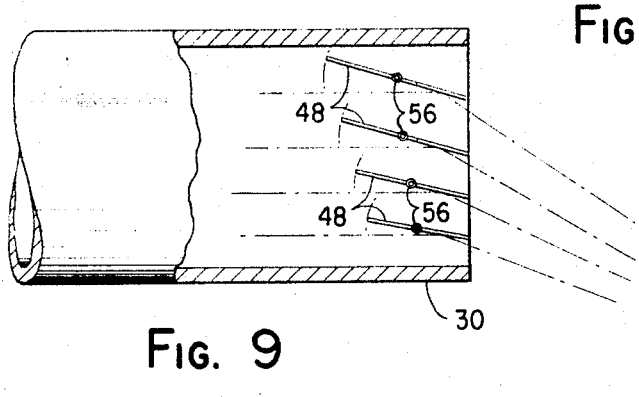
FIG. 9 is a schematic diagram of the sighting end of a guide having adjustable reflecting surfaces.

Referring to FIG. 9, I show a plurality of flat mirrors 48 mounted in an energy guide 30 of the type described in FIG. 2. Each mirror in FIG. 9 is equipped with an individual adjustment screw 56 to enable positioning of the mirrors to the desired angle with respect to the energy guide centerline. In some installations it may not be possible to predetermine the exact location of the radiation field. In these applications each mirror would be provided with an adjustment 56 and positioned by trial and error. It is evident that the reflecting surfaces shown in the other modifications can be similarly provided with adjustment screws.

It will be apparent to those skilled in the art that many changes may be made in the construction and arrangement of parts without departing from the scope of the invention as defined in the appended claims.

I claim:
1. Apparatus for remote detection of a radiant energy field, comprising, a detector responsive to radiant energy, a tubular housing coupled to said detector, a plurality of mirrors located in said housing to reflect radiant energy to said detector from said field in collimated rays through said housing, said mirrors mounted in said housing at different angles with respect to the centerline thereof to substantially optimize the area of the radiant energy field viewed.

2. Apparatus according to claim 1 wherein the relative lengths of said mirrors are inversely proportional to the sine of the angles of the mirrors with the housing centerline whereby substantially equal areas of the radiant energy field are reflected by said mirrors onto said detector.

3. Apparatus according to claim 1 including a window enclosing the end of said housing adjacent to said mirrors to seal the interior of said housing from corrosive gases and abrasive materials.

4. Apparatus according to claim 3 including a second tubular housing enclosing said first named housing having an opening adjacent to said windows and providing an annular passageway with said first housing for directing a stream of cleansing fluid against said window for continuous cleaning thereof.

5. Apparatus according to claim 4 including means for angularly adjusting said first housing relative to said second housing whereby a particular portion of the radiant energy field is viewed by said mirrors.

6. An apparatus combination as claimed in claim 5 wherein said adjustable mounting means comprises a slotted flanged end of said first housing for adjustably mounting said first housing with respect to said second housing.

7. An apparatus combination as claimed in claim 1 wherein said mirrors are adjustably mounted for modification of the detector's viewing field.

8. An apparatus combination as claimed in claim 1 wherein said mirrored surfaces are cone shaped and concentrically mounted.

9. An apparatus combination as claimed in claim 1 further including a convex lens mounted within said housing adjacent to said detector for concentrating said reflected energy on said detector.

References Cited

UNITED STATES PATENTS 1,931,668  10/1933  Maurer.
2,536,872  1/1951  Cookson _____ 350—304
3,151,206  9/1964  Daymon.

ARCHIE R. BORCHELT, Primary Examiner.

A. B. CROFT, Assistant Examiner.

U.S. Cl. X.R.

250—86; 350—299, 304

UNITED STATES PATENT OFFICE
CERTIFICATE OF CORRECTION

Patent No. 3,454,767                                                                     July 8, 1969

Robert J. Stevens

It is certified that error appears in the above identified patent and that said Letters Patent are hereby corrected as shown below:

Column 3, line 66, after "30." insert -- As the angle of incidence between the radiant energy and the mirrors becomes smaller, the size of the mirror needed to reflect an energy beam of a given cross-sectional area becomes larger. Therefore, the length of the various mirrors will be inversely proportional to the sine of the mirror angle relative to the centerline of energy guide 30. --.

Signed and sealed this 21st day of April 1970.

(SEAL)
Attest:

Edward M. Fletcher, Jr.                                    WILLIAM E. SCHUYLER, JR.
Attesting Officer                                                Commissioner of Patents